US011260558B2

(12) United States Patent
Fujie et al.

(10) Patent No.: US 11,260,558 B2
(45) Date of Patent: Mar. 1, 2022

(54) MASKING METHOD FOR HONEYCOMB FORMED BODY, PLUGGED PORTION FORMING METHOD FOR HONEYCOMB FORMED BODY, AND MANUFACTURING METHOD OF HONEYCOMB FIRED PRODUCT

(71) Applicant: NGK INSULATORS, LTD., Nagoya (JP)

(72) Inventors: Nobuhiro Fujie, Nagoya (JP); Yuji Watanabe, Nagoya (JP); Ken Itadu, Nagoya (JP); Yoshihiro Sato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 302 days.

(21) Appl. No.: 16/357,809

(22) Filed: Mar. 19, 2019

(65) Prior Publication Data
US 2019/0344473 A1 Nov. 14, 2019

(30) Foreign Application Priority Data

Mar. 27, 2018 (JP) .............................. JP2018-060661

(51) Int. Cl.
*B28B 11/00* (2006.01)
*B28B 3/26* (2006.01)
*B29C 63/00* (2006.01)

(52) U.S. Cl.
CPC ............ *B28B 11/007* (2013.01); *B28B 3/269* (2013.01); *B29C 63/0013* (2013.01)

(58) Field of Classification Search
CPC ......... B28B 3/20; B28B 11/00; B28B 11/007; B28B 3/269; B28B 17/0081; B01D 2239/0428; B01D 39/2068; B01D 46/2418; C04B 35/00; C04B 38/0012; C04B 2111/00793; C04B 38/0019; F01N 3/022; B29C 63/0013
See application file for complete search history.

(56) References Cited

U.S. PATENT DOCUMENTS

2006/0169384 A1* 8/2006 Fujita .................... F01N 3/0222
156/1
2009/0229765 A1* 9/2009 Furukubo ............. B28B 11/006
156/757
2011/0262639 A1* 10/2011 Sato ........................ C04B 41/87
427/181

FOREIGN PATENT DOCUMENTS

CN 1691299 A 11/2005
JP 2009-220298 A1 10/2009

* cited by examiner

*Primary Examiner* — Jacob T Minskey
*Assistant Examiner* — S. Behrooz Ghorishi
(74) *Attorney, Agent, or Firm* — Burr & Brown, PLLC

(57) ABSTRACT

A masking method for honeycomb formed body, including bonding a film on at least one bottom face of a honeycomb formed body in a quadrangular prism shape such that an adhesive surface is in contact with the bottom face. The step of bonding the film includes bonding of the film so as to have a bottom face covering portion that covers a whole surface of the bottom face and a pair of outer edge portions along one pair of opposite sides of a quadrangle defining an outer peripheral shape of the bottom face and a pair of protruding portions protruding from another pair of opposite sides of the quadrangle. At least a part of the adhesive surface of each of the pair of protruding portions is bonded so as to be in contact with a pair of opposing lateral faces of the honeycomb formed body.

11 Claims, 9 Drawing Sheets

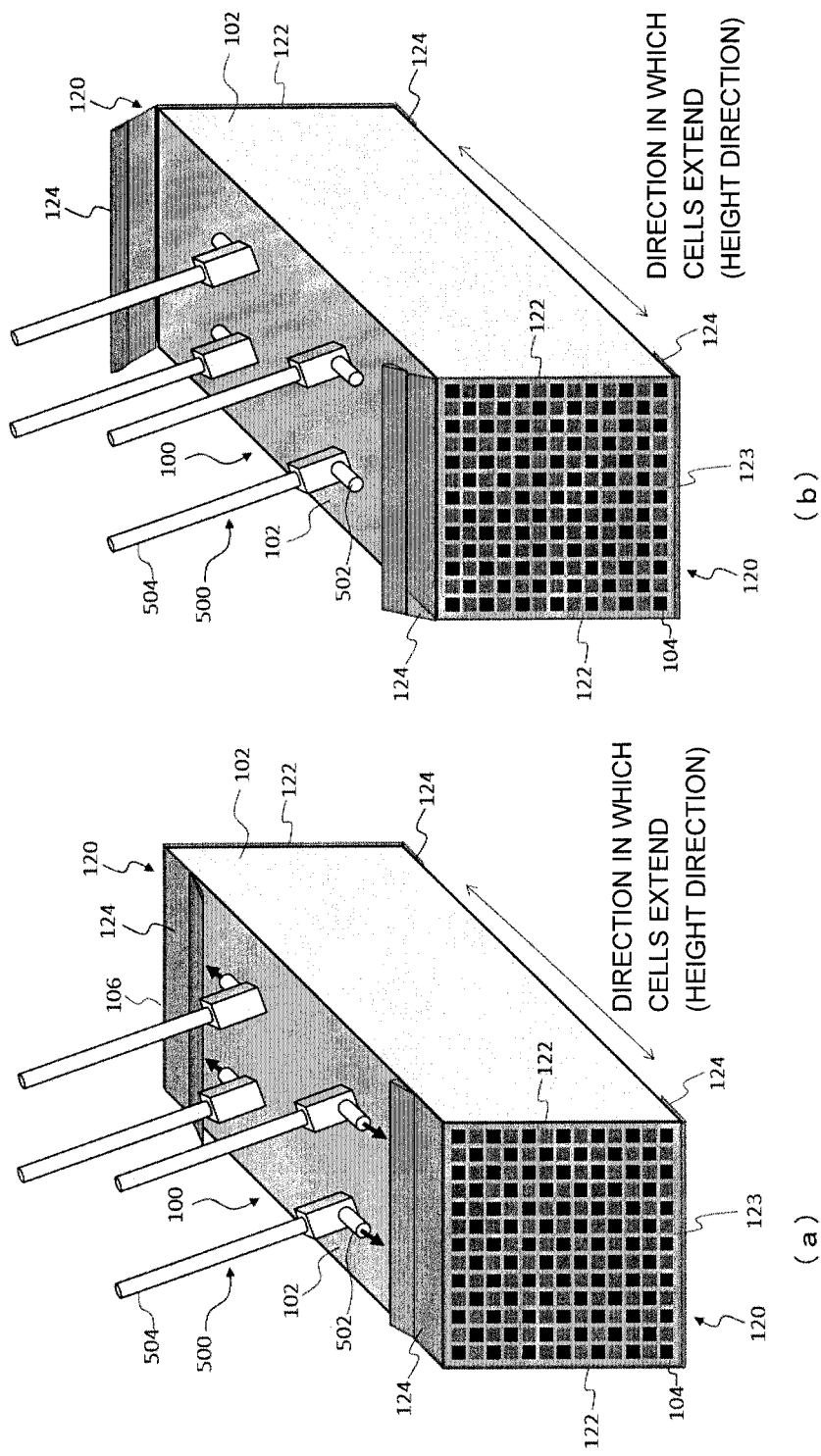

MASKING METHOD FOR HONEYCOMB FORMED BODY, PLUGGED PORTION FORMING METHOD FOR HONEYCOMB FORMED BODY, AND MANUFACTURING METHOD OF HONEYCOMB FIRED PRODUCT

TECHNICAL FIELD

The present invention relates to a masking method for a honeycomb formed body. Moreover, the present invention relates to a plugged portion forming method for a honeycomb formed body. Moreover, the present invention relates to a manufacturing method of a honeycomb fired product.

BACKGROUND ART

Exhaust gas emitted from an internal combustion engine such as a diesel engine contains a large amount of particulates (particulate matter) containing carbon as a main component which causes environmental pollution. Thus, a filter for collecting the particulate is mounted in an exhaust system such as a diesel engine in general.

As such filters, a pillar-shaped honeycomb structure 100 having a plurality of first cells 108a extending from a first bottom face 104 to a second bottom face 106, the first bottom face 104 being open and the second bottom face 106 having a plugged portion 103 and a plurality of second cells 108b extending from the first bottom face 104 to the second bottom face 106, the first bottom face 104 having the plugged portion 103 and the second bottom face 106 being open, and the first cells 108a and the second cells 108b are alternately disposed adjacently to each other across a partition wall 112 is known (see FIG. 10).

In this type of filters, the particulate matter is collected by the following mechanism. When the exhaust gas containing the particulate matter is supplied to the first bottom face 104 on an upstream side of the pillar-shaped honeycomb structure 100, the exhaust gas is introduced into the first cell 108a and advances toward a downstream in the first cell 108a. Since the first cell 108a has a second bottom face 106 on the downstream side plugged, the exhaust gas is transmitted through the porous partition wall 112 defining the first cell 108a from the second cell 108b and flows into the second cell 108b. Since the particulate matter cannot pass through the partition wall 112, they are captured in the first cell 108a. A clean exhaust gas flowing into the second cell 108b advances toward the downstream in the second cell 108b and is discharged from the second bottom face 106 on the downstream side.

Japanese Patent Laid-Open No. 2009-220298 discloses a manufacturing method of a pillar-shaped honeycomb structure having a plugged portion. A mask including an adhesive layer (hereinafter also called a "film") is bonded to one of bottom faces of the unfired honeycomb structure, and holes are opened in this mask by laser machining or the like using image processing at portions covering the cells on which the plugged portion is to be disposed and then, the bottom face portion to which the mask is bonded is immersed in plugging slurry so that the plugging slurry is filled in an end portion of the cells from the holes, and the mask bonded to the bottom face is peeled off after drying. The plugged portion is formed by the similar method also on the other bottom face. After that, by firing the pillar-shaped honeycomb structure having the plugged portion, a fired honeycomb structure is obtained and can be used as a filter.

A state of the mask bonded in accordance with the teaching in the gazette is illustrated in FIG. 11. According to the gazette, it is described that the mask (703) is bonded so as to cover the entire bottom face (701) of the honeycomb formed body (700), and a portion protruding from the bottom face (701) is folded onto a lateral face (704). Predetermined holes are opened in the mask, and the end portion of the cells are filled with the plugging slurry and then, the solidified plugging slurry adhering to the mask is removed by a brushing device. Then, the protruding portion of the mask is raised up by using an air injector. The raised-up protruding portion of the mask is gripped by gripping claws of a mask peeling device, and the mask is peeled.

CITATION LIST

Patent Literature

[Patent Literature 1] Japanese Patent Laid-Open No. 2009-220298

SUMMARY OF THE INVENTION

According to Patent Literature 1, it is described that the mask can be easily peeled off the plugged honeycomb formed body with mask without damaging the honeycomb formed body. However, according to an examination result by the inventor, it was found that the mask was not cleanly peeled off the honeycomb formed body in some cases, which causes a lowered yield of the honeycomb products.

The present invention has been created in view of the aforementioned circumstances and, in an aspect, has an object to provide a masking method for a honeycomb formed body which can easily peel off the bonded film. In another aspect, the present invention has an object to provide a plugged portion forming method using the masking method for a honeycomb formed body according to the present invention. In a further aspect, the present invention has an object to provide a manufacturing method of a honeycomb fired product using the plugged portion forming method according to the present invention.

In the masking method described in Patent Literature 1, a phenomenon in which the film was not peeled off the honeycomb formed body was studied. As a result, it was found that the film bonded to the bottom face of the honeycomb formed body protrudes from all the sides of the quadrangle bottom face of the honeycomb formed body, and the protruding portion is folded and bonded to the four lateral faces of the honeycomb formed body. That is why the film cannot be peeled off easily. Actually, the following phenomena (1) to (3) occurred due to the bonding of the film to the four lateral faces of the honeycomb formed body:

(1) A raising-up operation of the film by the air injector fails;
(2) Even if the film is raised up, a film position when it is raised up is not stable, and the film cannot be gripped by the gripping claws of the mask peeling device; and
(3) The film gripped by the gripping claws of the mask peeling device is removed from the gripping claws.

The present inventors made an extensive study on a measure that enables the film not to be peeled off easily when the plugging slurry is filled in the end portion of the cell, while enables the film to be peeled off easily when the film is to be peeled off, and found that bonding of the film only on the pair of opposing lateral faces in addition to the bottom face of the honeycomb formed body is effective. The present invention has been completed on the basis of the finding and is exemplified in the following.

[1]

A masking method for honeycomb formed body, comprising steps of:

preparing a honeycomb formed body in a quadrangular prism shape including a plurality of cells extending from a first bottom face to a second bottom face;

preparing at least one sheet of film having an adhesive surface on one main surface and a non-adhesive surface on another main surface; and bonding the film on at least one bottom face of the first bottom face and the second bottom face of the honeycomb formed body such that the adhesive surface is in contact with the at least one bottom face, wherein the step of bonding the film includes bonding of the film so as to have:

a bottom face covering portion that covers a whole surface of the at least one bottom face; and a pair of outer edge portions along one pair of opposite sides of a quadrangle defining an outer peripheral shape of the at least one bottom face and a pair of protruding portions protruding from another pair of opposite sides of the quadrangle; and bonding at least a part of the adhesive surface of each of the pair of protruding portions so as to be in contact with a pair of opposing lateral faces of the honeycomb formed body.

[2]

The masking method for honeycomb formed body according to [1], wherein the step of bonding comprises folding back at least one of the protruding portions and bonding at least a part of adhesive surfaces of the at least one of the protruding portions together

[3]

The masking method for honeycomb formed body according to [2], wherein in the at least one of the protruding portions, bonding of the adhesive surfaces is performed so that 30% or more of an area of the adhesive surface of the at least one of the protruding portions is shielded.

[4]

The masking method for honeycomb formed body according to [2] or [3], wherein the step of bonding comprises folding back the at least one of the protruding portions in parallel with one side of the quadrangle, the side forming a boundary of the at least one of the protruding portions.

[5]

The masking method for honeycomb formed body according to any one of [1] to [4], wherein an area where the adhesive surface is in contact with the lateral face of honeycomb formed body is 800 mm$^2$ or less in each of the protruding portions.

[6]

A plugged portion forming method for a honeycomb formed body, comprising steps of:

performing the masking method for the honeycomb formed body according to any one of [1] to [5];

opening a plurality of holes in the bottom face covering portion of the film and then, injecting plugging slurry into the holes;

drying and solidifying the slurry;

removing the solidified slurry adhering to the film; and peeling the film off the honeycomb formed body.

[7]

The plugged portion forming method for a honeycomb formed body according to [6], wherein the step of peeling the film off the honeycomb formed body includes steps of:

raising up at least one of the protruding portions of the film with an air blow from an air injector; and peeling the film off the honeycomb formed body by gripping at least one of the raised-up protruding portions with a film peeling-off device having a gripper.

[8]

The plugged portion forming method for a honeycomb formed body according to [7], wherein at least one of the protruding portions of the film has a portion having both outer surfaces being non-adhesive surfaces formed by folding back the at least one of the protruding portions and by bonding at least a part of the adhesive surfaces of the at least one of the protruding portions together, and the film peeling-off device grips the portion having both outer surfaces being the non-adhesive surfaces in the at least one of the raised-up protruding portions.

[9]

The plugged portion forming method for a honeycomb formed body according to [7], wherein the step of peeling the film off the honeycomb formed body comprises brushing the bottom face covering portion of the film

[10]

The plugged portion forming method for a honeycomb formed body according to [9], wherein the step of peeling the film off the honeycomb formed body comprises rotating at least one rotating brush having a rotation axis in parallel with a direction in which the cells extend, the rotating brush including a base body rotatable around the rotation axis and a plurality of brush bristles planted on a surface of the base body, while bringing the brush bristles into contact with the bottom face covering portion of the film.

[11]

A manufacturing method of a honeycomb fired product, comprising firing a honeycomb formed body obtained by implementing the plugged portion forming method according to any one of [7] to [10].

According to an embodiment of the masking method for a honeycomb formed body according to the present invention, the film bonded to the bottom face can be easily peeled off. This feature is advantageous in a point that a production speed can be improved in both a case where a film peeling-off work is performed manually and a case where it is performed automatically by a film peeling-off device. Particularly, when the film peeling-off work is performed automatically by using the film peeling-off device, a film peeling-off success rate increases, and the yield of the honeycomb products is improved.

BRIEF DESCRIPTION OF THE DRAWINGS

FIG. 5 are schematic views illustrating a state where the protruding portion of a film is raised up by using an air injector;

DESCRIPTION OF THE PREFERRED EMBODIMENTS

Subsequently, embodiments of the present invention will be described in detail by referring to the attached drawings. The present invention is not limited to the following embodiments but it should be understood that change, improvement and the like can be made on design as appropriate on the basis of ordinary knowledge of those skilled in the art within a range not departing from the gist of the present invention.

(1. Honeycomb Formed Body)

Figure 1:
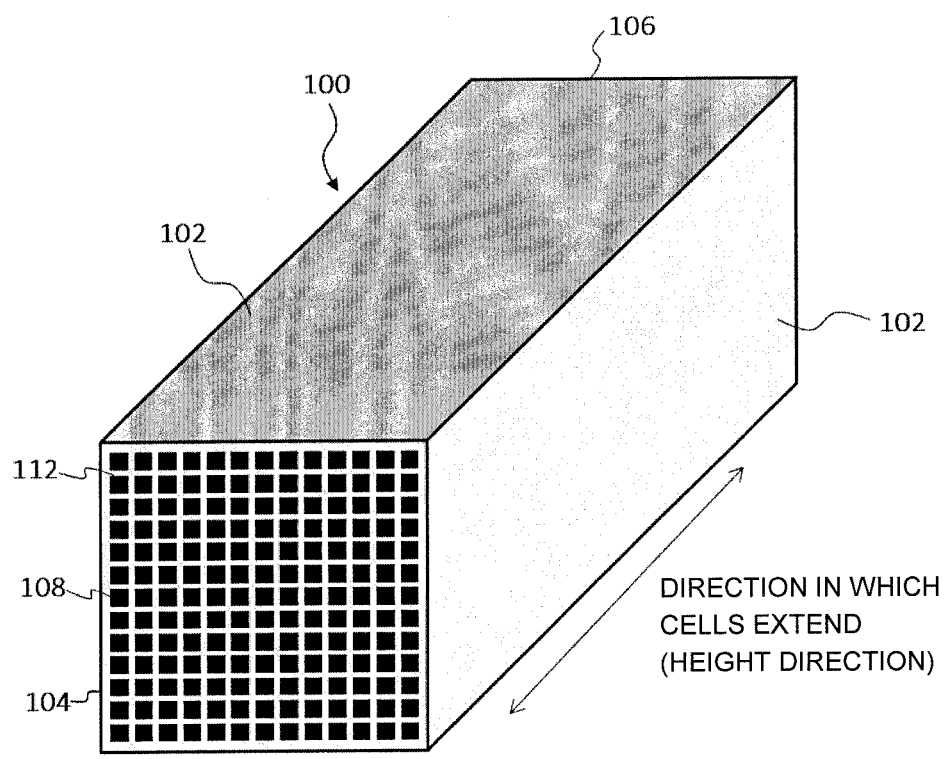
FIG. 1 is a perspective view schematically illustrating an example of a honeycomb formed body in a quadrangular prism shape to be a target of a masking method according to the present invention.

FIG. 1 describes a perspective view schematically illustrating an example of a honeycomb formed body in a quadrangular prism shape to be a target of a masking method according to the present invention. The illustrated honeycomb formed body 100 includes lateral faces 102 and a plurality of cells 108 disposed inside the lateral faces 102 and extending from a first bottom face 104 to a second bottom face 106. The plurality of cells 108 are partitioned and defined by porous partition walls 112.

An outer shape of the honeycomb formed body is not particularly limited as long as it has a quadrangular prism shape. The bottom face can be a rectangular or a square, for example. Moreover, with regard to a size of the honeycomb structure, an area of the bottom face is preferably 2000 to 20000 mm² or more preferably 5000 to 15000 mm² from a viewpoint of enhancing thermal shock resistance.

A shape of the cells on a cross section orthogonal to a direction in which the cells extend (height direction) is not limited but it is preferably a quadrangle, a hexagon, an octagon or combinations of them. A square and a hexagon are preferable among them. By forming the cell shape as above, when a fired product of the honeycomb formed body is used as a filter, a pressure loss when the exhaust gas flows becomes small, and purification performances become excellent.

The honeycomb formed body can be manufactured in accordance with the following procedure, for example. A raw material composition containing a ceramic raw material, a dispersion medium, a pore former, and a binder is kneaded so as to form a green body and then, the green body is subjected to extrusion molding so as to make a honeycomb formed body. Additives such as a dispersion agent or the like can be mixed in the raw material composition as necessary. In the extrusion molding, a die having a desired entire shape, a cell shape, a partition wall thickness, a cell density or the like can be used. After the extrusion molding, the honeycomb formed body is preferably dried.

The ceramics raw materials include, but not limited to, materials for obtaining ceramics such as cordierite, mullite, zircon, aluminum titanate, silicon carbide, silicon nitride, zirconia, spinel, indialite, sapphirine, corundum, titania and the like. Specifically, but not limiting, silica, talc, alumina, kaolin, serpentine, pyroferrite, brucite, boehmite, mullite, magnesite and the like are cited. The ceramics raw material may be singly used or may be used in combination of two types or more.

(2. Masking)

Figure 2:
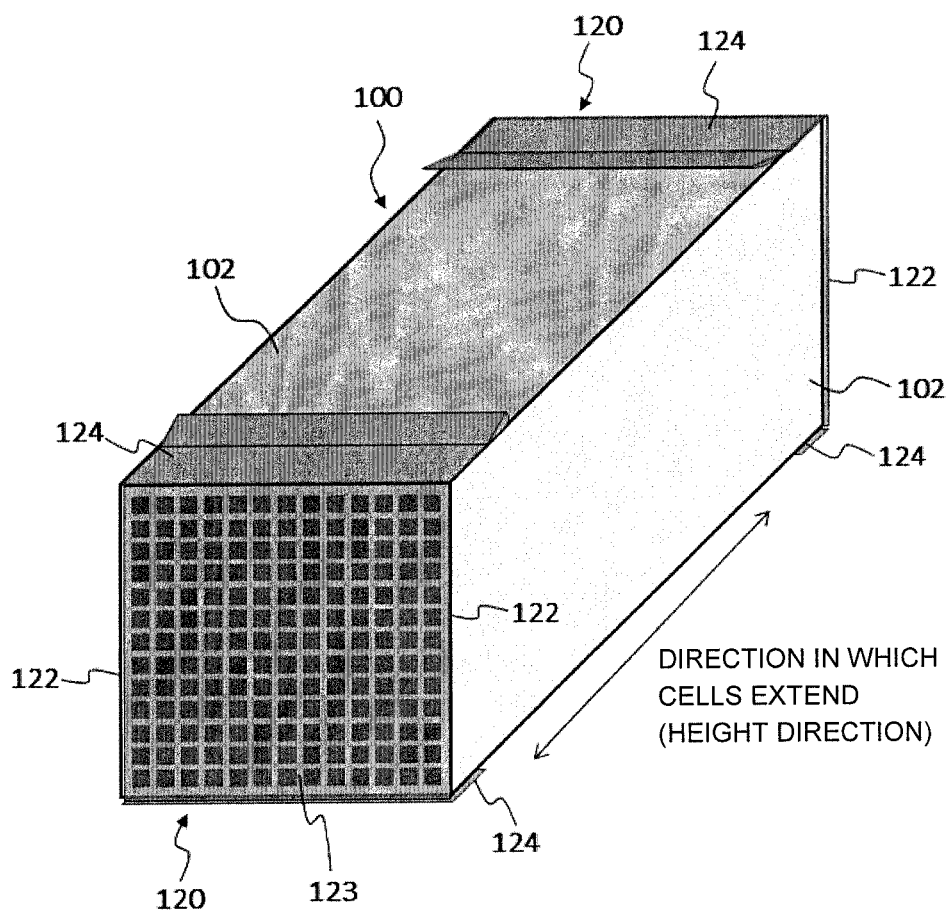
FIG. 2 is a schematic perspective view for explaining a bonding method of a film according to an embodiment of the masking method of a honeycomb formed body according to the present invention.

Subsequently, the masking method for the honeycomb formed body will be described. FIG. 2 illustrates a schematic view for explaining how to bond a film according to one embodiment of the masking method of the honeycomb formed body according to the present invention.

First, at least one or preferably two films 120 each having an adhesive surface on one main surface and a non-adhesive surface on the other main surface are prepared. The film 120 having an area larger than an area of each bottom face of a honeycomb formed body is used. A material of the film is not particularly limited, but polypropylene (PP), polyethylene terephthalate (PET), polyimide or Teflon (registered trademark) is preferable since thermal working for forming holes which will be described later is easy. A material of the adhesive surface of the film is preferably an acrylic resin, rubbers (rubber having a natural rubber or a synthetic rubber as a main component), and a silicone-based resin.

With regard to an adhesive force of the adhesive surface of the film, a value measured in compliance with a test method 1 in JIS Z0237:2009 is preferably 1.2 to 2.5 N/cm, more preferably 1.4 to 2.3 N/cm and particularly preferably 1.6 to 1.9 N/cm. When the aforementioned adhesive force is 1.2 N/cm or more, a possibility that the film is peeled off during brushing for removing excess plugging slurry which will be described later can be reduced. Moreover, when the aforementioned adhesive force is 2.5 N/cm or less, the film is easily peeled off the bottom face of the honeycomb formed body in a peeling-off process of the film which will be described later. A thickness of the film is preferably 20 to 50 μm preferably 30 to 40 μm. When the film thickness is 20 μm or more, wrinkles are not generated easily, and the film can be accurately bonded to the bottom face of the honeycomb formed body easily, and the film can be easily folded accurately. Moreover, a merit that a possibility that slurry is filled in unnecessary cells is reduced can be obtained. Furthermore, when the film thickness is 50 μm or less, a state where the portion protruding from the bottom face is folded can be maintained easily.

Subsequently, at least one sheet of film is bonded to at least one bottom face of the first bottom face 104 and the second bottom face 106 of the honeycomb formed body 100 obtained by the aforementioned procedure so that the adhesive surface of the film 120 is in contact with at least one bottom face of the honeycomb formed body 100. The film 120 is preferably bonded to both the first bottom face 104 and the second bottom face 106 of the honeycomb formed body 100.

The film 120 is preferably bonded so that a bottom face covering portion 123 that covers the whole surface of each of the bottom faces to which the film is bonded is formed. As a result, during formation of a plugged portion performed in the subsequent process, entry of the plugging slurry into the unnecessary cells can be prevented.

Moreover, the film 120 is preferably bonded by adjusting the size of the film so that a pair of outer edge portions 122 along one pair of opposite sides of the quadrangle defining the outer peripheral shape of each of the bottom faces (104, 106) to which the film is bonded and a pair of protruding portions 124 protruding from the other pair of opposite sides of the quadrangle are formed. Then, at least a part of the adhesive surface of each of the pair of protruding portions 124 is preferably bonded so as to be in contact with a pair of opposing lateral faces of the honeycomb formed body 100. As a result, the film is not peeled off easily to an appropriate degree, and unintentional peeling-off of the film and entry of the plugging slurry into the unnecessary cells can be prevented during the plugged portion formation performed in the subsequent process.

When the pair of protruding portions 124 is bonded to the pair of opposing lateral faces of the honeycomb formed body 100, it is preferable that at least one of the protruding portions 124 is folded back and at least a part of the adhesive surfaces of the folded-back protruding portion 124 are bonded together. Since an outer surface of the protruding portion 124 in which the adhesive surfaces are bonded together becomes a non-adhesive surface, it is not bonded to the lateral face of the honeycomb formed body 100. Therefore, such a merit is obtained that the film can be easily raised up manually or by using an air injector in the subsequent process. Moreover, by peeling off the film 120 while gripping the outer surface of the protruding portion 124 in which the adhesive surfaces are bonded together, adhesion of the peeled-off film to the hand or a gripping claw of the film peeling-off device can be prevented, which can improve work efficiency. It is preferable that, after folding back, the adhesive surface of the protruding portion 124 which is not folded back be bonded entirely to the lateral face of the honeycomb formed body so that the adhesive surface is not exposed.

When the film is to be peeled off, since the peeling-off can be easily carried out by gripping only one protruding portion 124 of the pair of protruding portions 124 bonded to the pair of opposing lateral faces of the honeycomb formed body 100, it is only necessary that one of the protruding portions 124 is folded back, and at least a part of the adhesive surfaces of the folded-back protruding portion 124 are bonded together.

The longer the folded-back length of the protruding portion 124 is, the larger the area where the non-adhesive surface forms the outer surface of the protruding portion 124 becomes. Therefore, such merits can be obtained that the film can be raised up easily, the film can be peeled off easily, and a gripping region of the film can be made larger. From this viewpoint, the protruding portion 124 is preferably folded back so that 30% or more of the area of the adhesive surface in the folded-back protruding portion 124 is shielded, more preferably the protruding portion 124 is folded back so that 50% or more is shielded, and further preferably the protruding portion 124 is folded back so that 60% or more is shielded.

However, the longer the folded-back length of the protruding portion 124 is, the lower the adhesive force of the film to the lateral face of the honeycomb formed body 100 becomes. If the adhesive force of the film to the lateral face of the honeycomb formed body 100 excessively lowers, the film is unintentionally peeled off during formation of the plugged portion performed in the subsequent process, and there is a possibility that the plugging slurry enters into the unnecessary cells. Thus, the protruding portion 124 is preferably folded back so that less than 100% of the area of the adhesive surface of the folded-back protruding portion 124 is shielded, more preferably the protruding portion 124 is folded back so that 90% or less is shielded, and further preferably the protruding portion 124 is folded back so that 80% or less is shielded.

Figure 3:
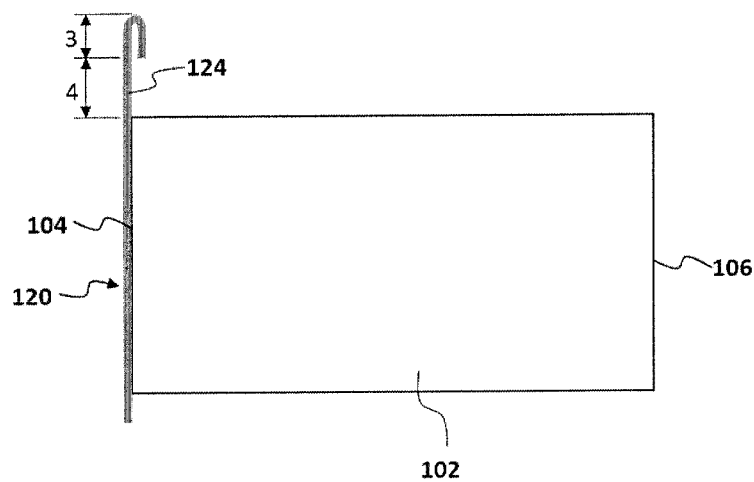
FIG. 3 is a schematic side view for explaining a relationship between an area of an adhesive surface of a protruding portion and an area shielded by folding back the protruding portion.

FIG. 3 illustrates a schematic side view for explaining a relationship between the area of the adhesive surface of the folded-back protruding portion 124 and the area of the adhesive surface shielded by the folding-back of the protruding portion 124. In FIG. 3, when being observed from the lateral face, the length of the adhesive surface of the folded-back protruding portion 124 is 10 and the folded-back length is 3. At this time, assuming that the area of the adhesive surface of the protruding portion before folding-back is 10, the area of the adhesive surface of the protruding portion shielded by folding-back is 6 and thus, 60% of the area of the adhesive surface of the protruding portion is considered to be shielded.

Figure 4A:
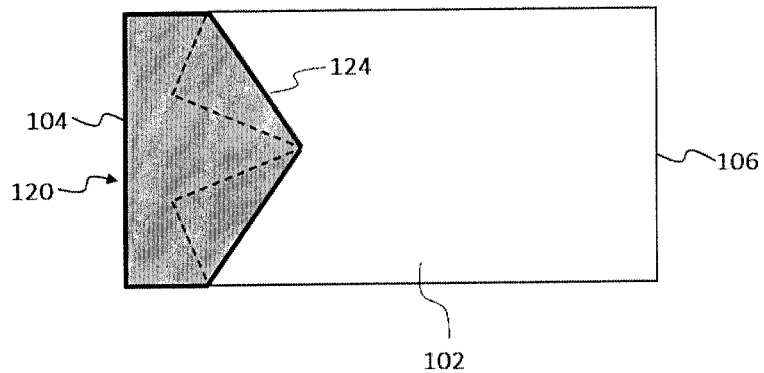
FIG. 4A is a schematic side view for explaining another example of the folding method of the protruding portion.
Figure 4B:
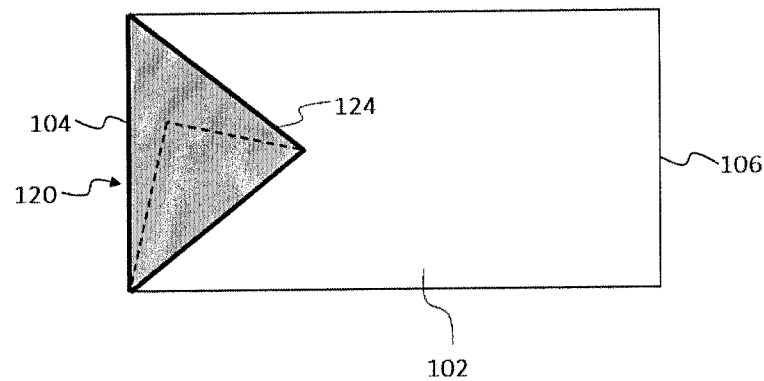
FIG. 4B is a schematic side view for explaining still another example of the folding method of the protruding portion.
Figure 4C:
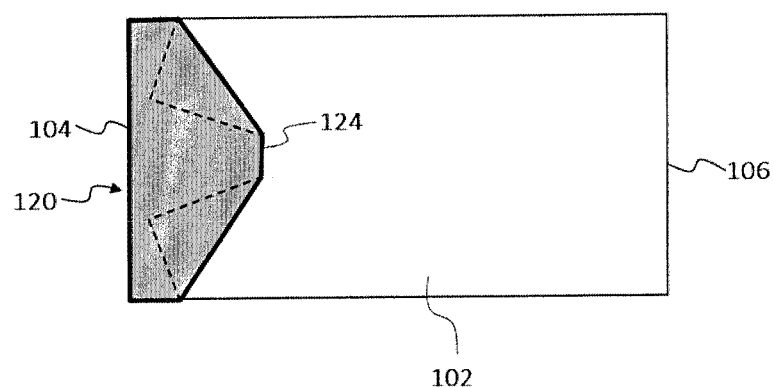
FIG. 4C is a schematic side view for explaining still another example of the folding method of the protruding portion.

In an example illustrated in FIGS. 2 and 3, the protruding portion 124 is folded back in parallel with one side of the quadrangle, the side forming the boundary of the protruding portion 124, but the folding-back method is not limited to that. For example, as illustrated in FIG. 4A, the protruding portion 124 can be folded back so that the shape of the protruding portion 124 after folding-back becomes a pentagon or as illustrated in FIG. 4B, it can be folded back so that the shape of the protruding portion 124 after folding-back becomes a triangle. Furthermore, as illustrated in FIG. 4C, the protruding portion 124 can be folded back so that the shape of the protruding portion 124 after folding-back becomes a hexagon. Dotted lines in FIGS. 4A, 4B, and 4C indicate a film portion folded back inward.

The area where the adhesive surface of the film is in contact with the lateral face of the honeycomb formed body in each protruding portion is preferably 800 $mm^2$ or less, more preferably 600 $mm^2$ or less or further preferably 400 $mm^2$ or less from a viewpoint of facilitating peeling-off in the subsequent process, though it depends on the material of the adhesive surface in use and the material of the honeycomb formed body. However, the smaller the area where the adhesive surface of the film is in contact with the lateral face of the honeycomb formed body is, the lower the adhesive force of the film to the lateral face of the honeycomb formed body 100 becomes. If the adhesive force of the film to the lateral face of the honeycomb formed body 100 excessively lowers, the film is unintentionally peeled off during formation of the plugged portion performed in the subsequent process, and there is a possibility that the plugging slurry enters into the unnecessary cells. Thus, the area of the adhesive surface of the film in contact with the lateral face of the honeycomb formed body in each of the protruding portions is preferably 35 $mm^2$ or more, preferably 100 $mm^2$ or more, and further preferably 200 $mm^2$ or more, though it depends on the material of the adhesive surface in use and the material of the honeycomb formed body.

(3. Formation of Plugged Portion)

According to an aspect of the present invention, a plugged portion forming method using the masking method of a honeycomb formed body according to the present invention is provided.

In an embodiment, the plugged portion forming method according to the present invention includes:

performing the masking method of a honeycomb formed body according to the present invention;

opening a plurality of holes in a bottom face covering portion of the film and then, injecting plugging slurry into the holes;

drying and solidifying the slurry;

removing the solidified slurry adhering to the film; and peeling the film off the honeycomb formed body.

After the film is bonded by the masking method of the honeycomb formed body according to the present invention, a plurality of holes is opened in a film portion covering cells on which the plugged portion is to be disposed, and then, a bottom face portion on which the film is bonded is immersed in the plugging slurry, and the plugging slurry is injected into the end portions of the cells from the holes. A method of opening the holes in the film is not particularly limited, but it can be performed by laser machining using image processing, for example. The operation is performed to both bottom faces so that the honeycomb formed body in which the cells in both bottom faces are alternately plugged by the plugging slurry (hereinafter also called a "plugged honeycomb formed body with film") is obtained.

After the plugging slurry is injected into the end portion of the cell, a condition when the slurry is dried for solidification is not particularly limited, but it may be 20 to 60 minutes at 100 to 150° C., for example.

As the plugging slurry, the one prepared by mixing a ceramics powder, a dispersion medium (water or the like, for example), and additives such as a binder, a deflocculant, a foaming resin and the like as necessary can be used. As the ceramics, ceramics containing at least one type selected from a group consisting if cordierite, mullite, zircon, aluminum titanate, silicon carbide, silicon nitride, zirconia, spinel, indialite, sapphirine, corundum, and titania is preferable and the same material as that of the honeycomb structure is more preferable. As the binder, polyvinylalcohol and methylcellulose and the like can be cited.

The solidified plugging slurry often adheres to the film of the plugged honeycomb formed body with film at the bottom face side and the lateral face side of the honeycomb formed body. The solidified excess plugging slurry is preferably removed in order to facilitate peeling-off of the film in the subsequent process. A removing method of the solidified excess plugging slurry is not particularly limited, but removal can be performed by brushing, for example. The brushing may be performed manually, but it is preferably performed automatically by using a brushing device from an industrial viewpoint. With regard to a specific brushing device, the device described in Patent Literature 1 can be used, and the entire contents of which are herein incorporated by reference. Moreover, a brushing device having a rotating brush for peeling-off film which will be described later may be used as the brushing device.

After the solidified excess plugging slurry is removed, the film is peeled off the honeycomb formed body. The peeling-off method of the film is not particularly limited, and the film may be pulled manually and peeled off, but it is preferably performed automatically by using a film peeling-off device from an industrial viewpoint. As the film peeling-off device, a film peeling-off device having a gripping claw as described in Patent Literature 1, for example, can be used. Moreover, the film can be peeled off by brushing the bottom face covering portion of the film. The brushing can be performed manually but use of the brushing device is preferable from an industrial viewpoint.

<3-1 Film Peeling-Off using Film Peeling-Off Device having Gripping Claw>

When the film peeling-off device having a gripping claw is used, first, an operation of raising up the film bonded to the lateral face of the honeycomb formed body is preferably performed. This operation can be performed by using the air injector described in Patent Literature 1, for example. FIGS. 5 illustrate schematic perspective views for explaining a film raising-up operation by the air injector 500. FIG. 5(a) illustrates a state before the film raising-up. With respect to the film 120 bonded to the first bottom face 104 side, the air injector 500 injects air toward the first bottom face 104 side from the second bottom face 106 side (a direction of an arrow in the FIG.) along the lateral face 102 of the honeycomb formed body 100 on which the protruding portion 124 is provided. Moreover, the air injector 500 similarly injects air to the film 120 bonded to the second bottom face 106 side. As a result, as illustrated in FIG. 5(b), the film 120 bonded to each of the bottom faces (104, 106) is raised up and thus, the protruding portion can be easily gripped manually or by the film peeling-off device, and the mask can be reliably peeled off.

The film bonded to each bottom face of the honeycomb formed body is bonded with an appropriate adhesive force by being bonded to the pair of opposing lateral faces of the honeycomb formed body, while it is not bonded to another pair of opposing lateral faces of the honeycomb formed body. As a result, the film 120 is raised up easily as compared with a case where the film is bonded to four lateral faces of the honeycomb formed body.

As the air injector 500, an air injector including a nozzle 502 and an air pipeline 504 for sending air into this nozzle 502 can be used, for example. The air pipeline 504 can be connected to an air supply source such as a compressor, not shown.

A pressure of the air injected by the air injector is preferably 0.2 to 0.9 MPa, more preferably 0.3 to 0.6 MPa, and particularly preferably 0.3 to 0.5 MPa. Since the aforementioned pressure is 0.2 MPa or more, probability that the protruding portion of the film is raised up can be increased. Moreover, since the aforementioned pressure is 0.9 MPa or less, the possibility that the film is torn can be reduced. Moreover, injection time of the air is preferably 0.2 to 2.0 seconds, more preferably 0.3 to 1.5 seconds, and particularly preferably 0.5 to 1.0 seconds. If the injection time of the air is 0.2 seconds or more, the probability that the protruding portion of the film is raised up can be increased. Moreover, since the injection time of the air is 2.0 seconds or less, the possibility that the film is torn can be reduced. Moreover, the number of injecting times is preferably once to three times and more preferably once.

Moreover, though an injection angle of the air and a speed at which the air is injected are not particularly limited as long as the air injected by the air injector enters into a space between the protruding portion of the film and the lateral face of the honeycomb formed body, and the protruding portion of the film can be raised up, the injection angle of the air, that is, an angle formed by the lateral face of the honeycomb formed body and a direction in which the air is injected is preferably 5 to 60° or more preferably 15 to 45°.

Moreover, the speed at which the air is injected is preferably 100 to 400 m/second or more preferably 150 to 300 m/second.

Figure 6:
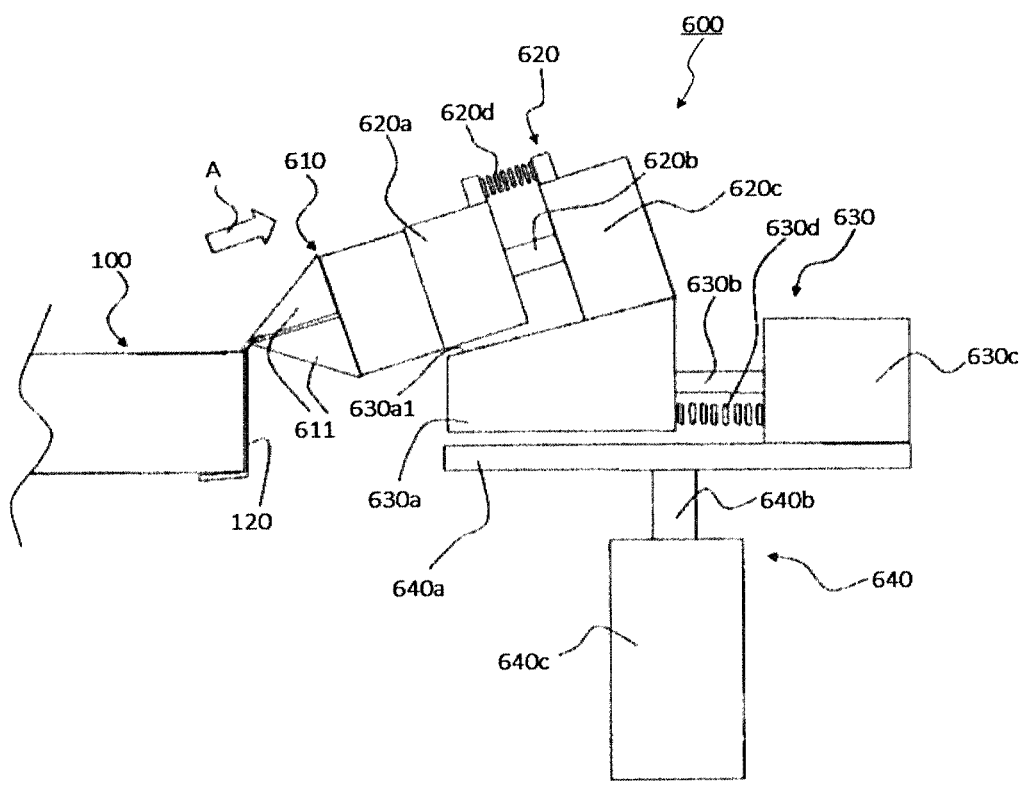
FIG. 6 is a side view schematically illustrating a state where the film is peeled off by a film peeling-off device.

The film can be peeled off by gripping the raised-up protruding portion of the film and pulling it by the gripping claws of the film peeling-off device. As the film peeling-off device, the film peeling-off device described in Patent Literature 1 can be used, for example, and the entire contents of which are herein incorporated by reference. FIG. 6 is a side view schematically illustrating a scene where the film 120 is peeled off by the film peeling-off device 600. The film peeling-off device 600 according to the illustrated embodiment includes a gripping device 610 including a pair of gripping claws 611 each having a gripping surface for gripping the protruding portion of the film and a claw driving device for opening/closing the gripping claws 611, a first linear driving device 620 for moving this gripping device 610, a second linear driving device 630 for moving the first linear driving device 620, and a third linear driving device 640 for moving the second linear driving device 630.

A gripping force of the pair of gripping claws is preferably 0.3 to 0.7 MPa, more preferably 0.4 to 0.6 MPa, and particularly preferably 0.5 to 0.55 MPa. Since the aforementioned gripping force is 0.3 MPa or more, easy slip of the film from the gripping claws can be prevented. Moreover, since the aforementioned gripping force is 0.7 MPa or less, the honeycomb formed body can be prevented from being broken by forcedly lowering down the gripping claws while the film adheres to the bottom face of the honeycomb formed body. That is, when the gripping force overcomes the adhesive force in case where the adhesive force of the film is too strong, the film is forcedly peeled off the bottom face, and there is a possibility that a part of the bottom face is lost, for example, but by setting the aforementioned gripping force at 0.7 MPa or less, this possibility can be reduced. Non-adhesive treatment for preventing adhesion of the peeled-off film is preferably applied to the gripping surface of each of the pair of gripping claws. As the non-adhesive treatment, tosical coating, fluorine-based resin coating, (PTFE, PFA, FEP and the like) and the like can be cited.

The first linear driving device 620 can include, as illustrated in FIG. 6, a connection portion 620*a* connected to the gripping device 610, a pillar-shaped first shaft 620*b* having one end fixed to this connection portion 620*a* and moving the connection portion 620*a* in a linear direction, a first cylinder 620*c* having a recess part in/out of which the first shaft 620*b* can be inserted/removed and having the first shaft 620*b* fitted in this recess part, and a cylindrical first tensile coil spring 620*d* having a center axis disposed along a center axis of the first shaft 620*b*, one end portion fixed to the connection portion 620*a*, the other end portion fixed to the first cylinder 620*c* and a predetermined spring constant for giving a force in a direction in which the connection portion 620*a* is moved toward the first cylinder 620*c*. In the first linear driving device 620, since the connection portion 620*a* is moved in accordance with a speed at which the film is peeled off the bottom face of the honeycomb structure by using the first tensile coil spring, a possibility that the mask is broken is reduced, and a possibility that a part of the film remains on the bottom face of the honeycomb formed body is reduced, which are advantages.

As the first cylinder, an air cylinder, a hydraulic cylinder, an electric cylinder and the like can be cited, for example. Among them, the air cylinder is preferable since control is easy. The first linear driving device can keep the first tensile coil spring extended by the first cylinder until the gripping claws grip the mask, and after the gripping claws grip the mask, it can make the connection portion (gripping claws) retreated by a spring force of the first tensile coil spring without applying the force for extending the first tensile coil spring by the first cylinder. A second cylinder which will be described later performs the similar operation.

The second linear driving device 630 can include, as illustrated in FIG. 6, a support body 630*a* connected to the first cylinder 620*c* of the first linear driving device 620 and supporting the first linear driving device 620, a pillar-shaped second shaft 630*b* having one end fixed to this support body 630*a* and moving the support body 630*a* in a horizontal direction, a second cylinder 630*c* having a recess part in/out of which the second shaft 630*b* can be inserted/removed and the second shaft 630*b* is fitted in this recess part, and a cylindrical second tensile coil spring 630*d* having a center axis disposed along a center axis of the second shaft 630*b*, one end portion fixed to the support body 630*a*, while the other end portion fixed to the second cylinder 630*c* and having a predetermined spring constant for giving a force in the direction in which the support body 630*a* is moved toward the second cylinder 630*c* in the horizontal direction. In the second linear driving device 630, since the support body 630*a* is moved in accordance with the speed at which the film is peeled off the bottom face of the honeycomb formed body by using the second tensile coil spring 630*d*, a possibility that the mask is broken is reduced, and the possibility that a part of the film remains on the bottom face of the honeycomb formed body is reduced, which are advantages.

The support body 630*a* has a first cylinder support surface 630*a*1 having 0 to 45° angle to the horizontal direction, and when the connection portion 620*a* of the first linear driving device 620 is moved in the linear direction by disposing the first cylinder 620*c*, that is, the first linear driving device 620 on this first cylinder support surface 630*a*1, the film 120 gripped by the pair of gripping claws 611 is pulled up in a diagonal direction. When the film 120 is thus pulled up in the diagonal direction, a force for pulling the protruding portion of the film is dispersed and thus, a merit that peeling-off is easy is obtained.

As the third linear driving device 640, as illustrated in FIG. 6, the one including a support plate 640*a* connected to the second cylinder 630*c* of the second linear driving device 630 and supporting the second linear driving device 630, a pillar-shaped third shaft 640*b* having one end fixed to the support plate 640*a* and moving the support plate 640*a* to a vertical direction, and a third cylinder 640*c* having a recess part in/out of which the third shaft 640*b* can be inserted/removed and the third shaft 640*b* fitted in this recess part can be used.

The film peeling-off operation by the film peeling-off device 600 will be exemplified. First, the protruding portion 124 raised-up by the air injector is sandwiched by the pair of gripping claws 611. At this time, the pair of gripping claws 611 preferably grips a portion having both outer surfaces as non-adhesive surfaces in the raised-up protruding portion and more preferably grips only the portion having both outer surfaces as non-adhesive surfaces in the raised-up protruding portion. Subsequently, the pair of gripping claws 611 is moved by pulling the first shaft 620*b* into the first cylinder 620*c*. At this time, a force is applied to the film 120 gripped by the pair of gripping claws 611 in a direction of an arrow A illustrated in FIG. 6. Subsequently, a state where the connection portion 620*a* is at a movement end is maintained for 0.2 to 0.7 seconds (preferably 0.3 to 0.5 seconds). Subsequently, the second shaft 630*b* is pulled into the second cylinder 630*c*, and after 0.2 to 0.7 seconds (preferably 0.3 to 0.5 seconds) from start of this pulling operation, the third shaft 640b is pulled into the third cylinder 640c. The second linear driving device 630 is thus moved downward in the vertical direction to lower the pair of gripping claws 611. When the pair of gripping claws 611 is lowered, peeling-off of the film is completed.

<3-2 Film Peeling-Off using Brushing Device>

Figure 7A:
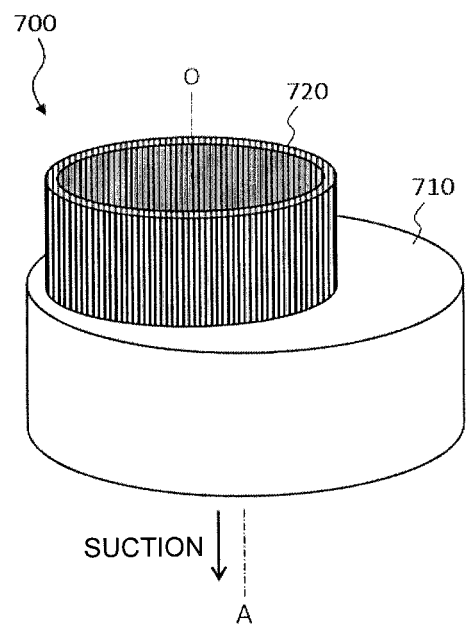
FIG. 7A is a schematic perspective view illustrating a structure example of a rotating brush.
Figure 7B:
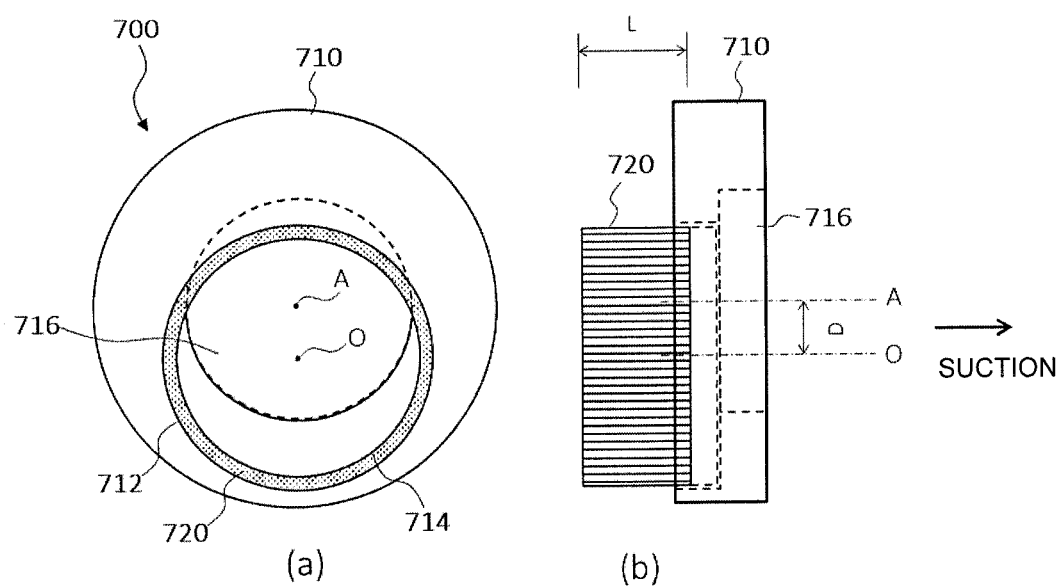
FIG. 7B is a view (a) illustrating a plan structure of the rotating brush and a view (b) illustrating a lateral face structure.

When a brushing device is used as a film peeling-off device, as illustrated in FIGS. 7A and 7B, for example, a rotating brush 700 including a base body 710 rotatable around a rotation axis A and a plurality of brush bristles 720 planted on the surface of the base body 710 can be suitably used. When the brushing device is to be used, since the protruding portion of the film is not gripped, the protruding portion of the film does not have to be folded back inward.

From a viewpoint of improving uniformity of the bottom face after the brushing, it is preferable that the film be peeled off by using two or more rotating brushes with different rotating directions or by reversing the rotating direction of the one rotating brush in the middle.

By referring to FIG. 7B, a size of an outer peripheral profile 712 of a surface region of the base body 710 on which a plurality of brush bristles 720 is planted can be set as appropriate in accordance with the size of a bottom area of the honeycomb formed body from a viewpoint that work efficiency is to be improved. For example, a bottom area X of the honeycomb formed body and an area Y surrounded by the outer peripheral profile 712 preferably satisfies a relational expression of $0.5 \leq Y/X \leq 4.5$ and more preferably satisfies the relational expression of $1.0 \leq Y/X \leq 3.5$.

In order to prevent dust generated when the film is peeled off from entering into the cells, the peeling-off of the film is preferably performed while they are being suctioned by a suction device (not shown). The suction device can play a role for assisting peeling-off of the film and also serves a function of suctioning the peeled-off film. Therefore, it is preferable that the base body 710 includes a suction port 716 communicating with the suction device, and the suction device is operated during peeling-off of the film so as to suction the dust from the suction port 716. The suction port 716 can be made to communicate with the suction device through a pipeline such as a hose, for example. In a preferred embodiment, the base body 710 has an annular (e.g.: circular ring-shaped) surface region on which a plurality of brush bristles 720 is planted and includes a suction port 716 communicating with the suction device on a portion inside an inner peripheral profile 714 of the surface region. The dust can be efficiently suctioned by the configuration.

The rotating brush is preferably driven by a motor capable of controlling a rotation number by an inverter. When the rotation number of the rotating brush is variable, an appropriate rotation number can be set in accordance with the material of the honeycomb formed body, the adhesive force of the film and the like. The higher the rotation number of the rotating brush is, the more peeling-off efficiency of the film rises in general, but if the rotation number is too high, it causes a damage on the honeycomb formed body, and the rotation number is preferably set by considering a balance between both. The rotation number of the rotating brush can be set to 100 to 600 rpm, for example, typically from 200 to 500 rpm, and more typically from 300 to 400 rpm.

A length L of the brush bristle 720 can be set as appropriate in accordance with the material and thickness of the brush bristle. The shorter the length of the brush bristle is, the stiffer the brush bristle becomes, and the peeling-off efficiency of the film is improved, but if it is too short, it easily damages the honeycomb formed body. Accordingly, the length L of the brush bristle 720 is preferably set by considering the balance of both. From a viewpoint that the peeling-off efficiency of the film is to be improved, the length L of the brush bristle 720 can be set to 50 mm or less, 40 mm or less or moreover, 30 mm or less. On the other hand, from a viewpoint that damage on the honeycomb formed body is suppressed, the length L of the brush bristle 720 can be set to 10 mm or more, 15 mm or more or moreover, 20 mm or more.

The material of the brush bristle includes, but not limited to, nylon, polypropylene, polyvinyl chloride, polyester, animal fibers (horse hair or the like) and the like, for example. Among them, nylon is preferable since it is excellent in abrasion resistance and flexibility.

A diameter (fiber diameter) of the brush bristle can be 0.2 to 0.8 mm, for example, typically 0.3 to 0.6 mm or more typically 0.4 to 0.5 mm.

A plurality of brush bristles is advantageously in contact with the bottom face of the honeycomb formed body at an angle close to right angle from a viewpoint of the peeling-off efficiency of the film. Thus, an angle formed by a planting direction of the plurality of brush bristles (direction at a root of the brush bristle) and the rotation axis direction is preferably 0 to 45°, more preferably 0 to 20°, and further preferably 0 to 10°.

The larger a pushing-in amount of the brush bristles (brush pushing-in amount) is in a direction perpendicular to the bottom face of the honeycomb formed body, the more the peeling-off efficiency of the film can be improved, but if it is excessive, a brushing pressure increases, and a damage risk to the honeycomb formed body increases. Accordingly, the brush pushing-in amount is preferably set by considering the balance of both. Though depending on the material, the length, and the thickness of the brush bristle, the brush pushing-in amount can be 0.1 or more, 0.5 mm or more, or moreover, 1 mm or more, for example, from a viewpoint of improvement of the peeling-off efficiency of the film. On the other hand, from a viewpoint of suppressing damage to the honeycomb formed body, the brush pushing-in amount can be 4 mm or less, 3 mm or less or moreover, 2 mm or less.

From a viewpoint that the film is peeled off without applying a local load to the bottom face of the honeycomb formed body, it is preferable that the plurality of brush bristles be brought into contact with the bottom face covering portion of the film bonded to each of the first bottom face and the second bottom face while at least one rotating brush having the rotation axis in parallel with the direction in which the first cell and the second cell extend (that is, the height direction of the honeycomb formed body) is rotated.

At this time, the gravity center O of the surface region of the base body on which the plurality of brush bristles is planted is preferably at a position biased from the rotation axis A (see FIGS. 7A and 7B). If the gravity center O of the surface region of the base body on which a plurality of brush bristles is planted is matched with the rotation axis A, the film cannot be peeled off at the region having a range wider than the surface region. Thus, if the rotation axis A is located at a center of the bottom face of the honeycomb formed body, the peeling-off effect of the film by the brush easily becomes weaker in the neighborhood of the outer periphery of the bottom face than in the neighborhood of the center on the bottom face of the honeycomb formed body. Moreover, the rotation axis needs to be displaced in order to widen the peeling-off region of the film.

On the other hand, as illustrated in FIGS. 7A and 7B, if the gravity center O of the surface region of the base body 710 on which the plurality of brush bristles 720 is planted is at the position biased from the rotation axis A, since the surface region is displaced by a bias distance even if the rotation axis is not displaced, the film can be peeled off at a wide region. Moreover, since a plurality of brush bristles can be displaced toward a center portion from an outer peripheral portion of the bottom face of the honeycomb formed body while in contact with the film, such an effect that the film can be peeled off easily can be also obtained.

A degree by which the gravity center O of the surface region is biased from the rotation axis A may be set as appropriate from viewpoints of the area of the surface region, the bottom area of the honeycomb formed body, and the peeling-off efficiency of the film. In a preferred embodiment, the rotation axis A is located inside the outer peripheral profile 712 of the surface region of the base body on which a plurality of brush bristles is planted. By this configuration, the peeling-off efficiency of the film close to the rotation axis A can be prevented from lowering, uniformity of the peeling-off effect of the film can be improved, and uniformity of the bottom face can be improved.

Referring to FIG. 7B, the distance by which the gravity center O of the surface region is biased to the direction orthogonal to the rotation axis A from the rotation axis A (bias distance D) can be 3 mm or more, preferably 5 mm or more, and more preferably 10 mm or more. An upper limit of the bias distance D is not particularly set, but in view of the bottom area of the ordinary honeycomb formed body used for a filter application for purifying exhaust gas from the diesel engine, the bias distance D is 50 mm or less in general and typically 30 mm or less.

From an industrial viewpoint, it is preferable that the film peeling-off process be continuously performed for a large number of honeycomb formed bodies subjected to the film peeling-off process. Thus, the preferred embodiment of the film peeling-off method of the plugged honeycomb formed body with film according to the present invention includes relative movement of at least one rotating brush in the direction in parallel with the first bottom face and the second bottom face of the honeycomb formed body. By referring to FIG. 8, it can be understood that bottom face treatment of a plurality of the honeycomb formed bodies 100 juxtaposed in the direction orthogonal to the direction in which the cells extend (height direction) can be continuously executed by relative movement of the rotating brush 700 in the direction in parallel with the first bottom face and the second bottom face of the honeycomb formed body 100.

As methods in which the rotating brush is relatively moved in the direction in parallel with the first bottom face and the second bottom face of the pillar-shaped honeycomb formed body, a method in which the bottom face treatment is executed sequentially by the rotating brush at a fixed position while a plurality of pillar-shaped honeycomb formed bodies is conveyed in one direction by a conveyer, and a method in which a plurality of the pillar-shaped honeycomb formed bodies juxtaposed in one row is sequentially subjected to the bottom face treatment by the rotating brush moving in parallel can be cited, for example.

Figure 8:
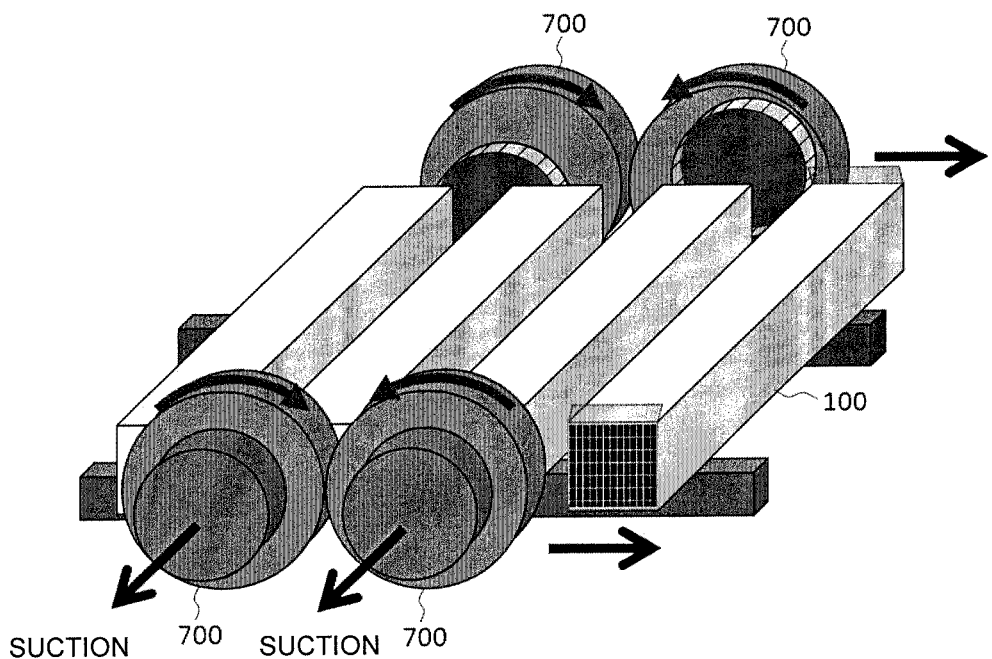
FIG. 8 is a schematic view illustrating a state where a film peeling-off process for a plurality of honeycomb formed body is executed continuously by one or more pairs of the rotating brushes.

The peeling-off of the film on the first bottom face side and the peeling-off of the film on the second bottom face side may be performed simultaneously or may be performed separately. From a viewpoint of work efficiency, the peeling-off of the film on the first bottom face side and the peeling-off of the film on the second bottom face side are preferably performed simultaneously. Therefore, in the preferred embodiment of the film peeling-off method of the plugged honeycomb formed body with film according to the present invention, the film peeling-off process is performed while the first bottom face and the second bottom face of the pillar-shaped honeycomb formed body 100 are sandwiched by one or more pairs of rotating brushes 700 as illustrated in FIG. 8. When two or more pairs of the rotating brushes 700 are to be used, in order to improve uniformity of the first bottom face and the second bottom face of the pillar-shaped honeycomb formed body 100 after the film peeling-off, at least one pair of the rotating brushes 700 preferably has a rotating direction opposite to that of the remaining at least one pair of the rotating brushes 700.

(4. Process after Film Peeling-Off)

According to an aspect of the present invention, a manufacturing method of a honeycomb fired product including firing of the honeycomb formed body obtained by executing the plugged portion forming method according to the present invention is provided. A well-known arbitrary condition may be employed as a firing condition, and there is no particular limitation.

A degreasing process may be executed before a firing process. A burning temperature of a binder is approximately 200° C., and a burning temperature of a pore former is approximately 300 to 1000° C. Therefore, the degreasing process only needs to be executed by heating the honeycomb formed body to a range of approximately 200 to 1000° C. The heating time is not limited but is typically approximately 10 to 100 hours. The honeycomb formed body after the degreasing process is called a calcined body. The firing process can be executed by heating the calcined body to 1350 to 1600° C. and holding the state for 3 to 10 hours, for example, though depending on a material composition of the honeycomb formed body.

Each of the honeycomb fired products can be used as a honeycomb segment, and lateral faces of a plurality of honeycomb segments are bonded and integrated by a bonding material so as to have a segment bonded body. The segment bonded body can be manufactured as follows, for example. The bonding material is applied to a bonding surface (lateral face) in a state where a film for preventing adhesion of bonding material is bonded to both bottom faces of each of the honeycomb segments.

Subsequently, these honeycomb segments are disposed adjacently so that the lateral faces of the honeycomb segments are faced with each other, and the adjacent honeycomb segments are pressure-bonded and then heated for drying. The segment bonded body in which the lateral faces of the adjacent honeycomb segments are bonded by the bonding material is thus fabricated. The segment bonded body may be so configured that an outer peripheral portion is ground to a desired shape (a cylindrical shape, for example), a coating material is applied to the outer peripheral surface and then heated for drying to form an outer peripheral wall.

A material of the film for preventing adhesion of bonding material is not particularly limited, but synthetic resins such as polypropylene (PP), polyethylene terephthalate (PET), polyimide or Teflon (registered trademark) and the like can be suitably used. Moreover, the film preferably includes an adhesive layer, and the material of the adhesive layer is preferably an acrylic resin, rubbers (rubber having a natural rubber or a synthetic rubber as a main component) or a silicone-based resin.

As the film for preventing adhesion of bonding material, an adhesive film having a thickness of 20 to 50 μm, for example, can be used suitably.

As the bonding material, the one prepared by mixing a ceramics powder, a dispersion medium (water or the like, for example), and additives such as a binder, a deflocculant, a foaming resin and the like can be used as necessary. As the ceramics, ceramics containing at least one type selected from the group consisting of cordierite, mullite, zircon, aluminum titanate, silicon carbide, silicon nitride, zirconia, spinel, indialite, sapphirine, corundum, and titania is preferable and the same material as that of the honeycomb structure is more preferable. As the binder, polyvinylalcohol and methylcellulose and the like can be cited.

EXAMPLES

Figure 9:
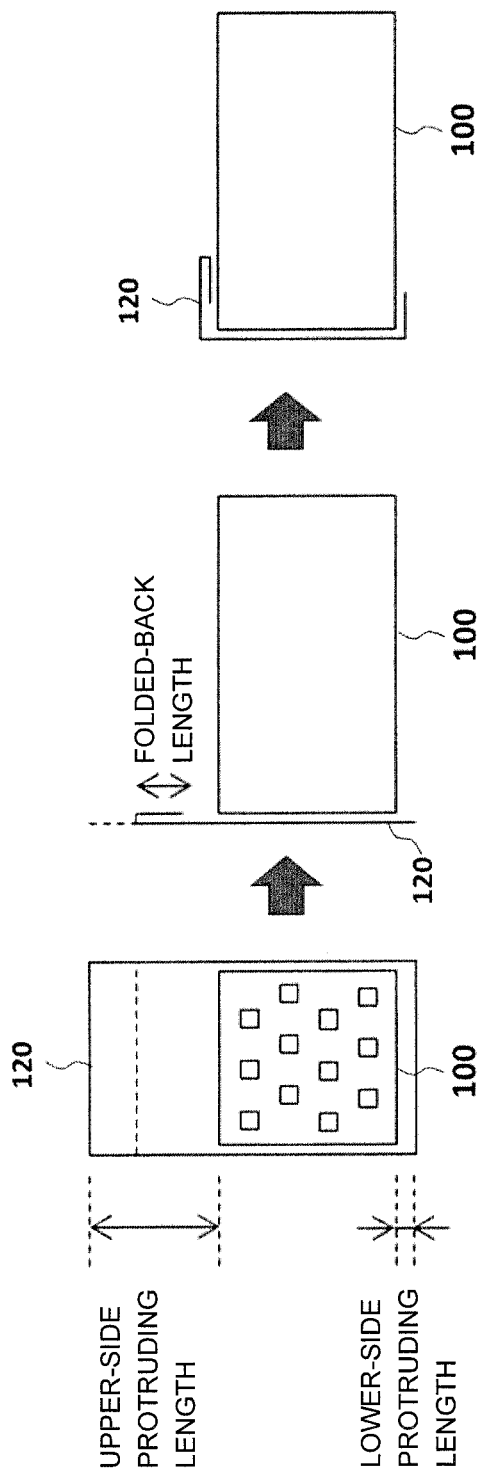
FIG. 9 is a schematic diagram for explaining how to bond the film in an example.
Figure 10:
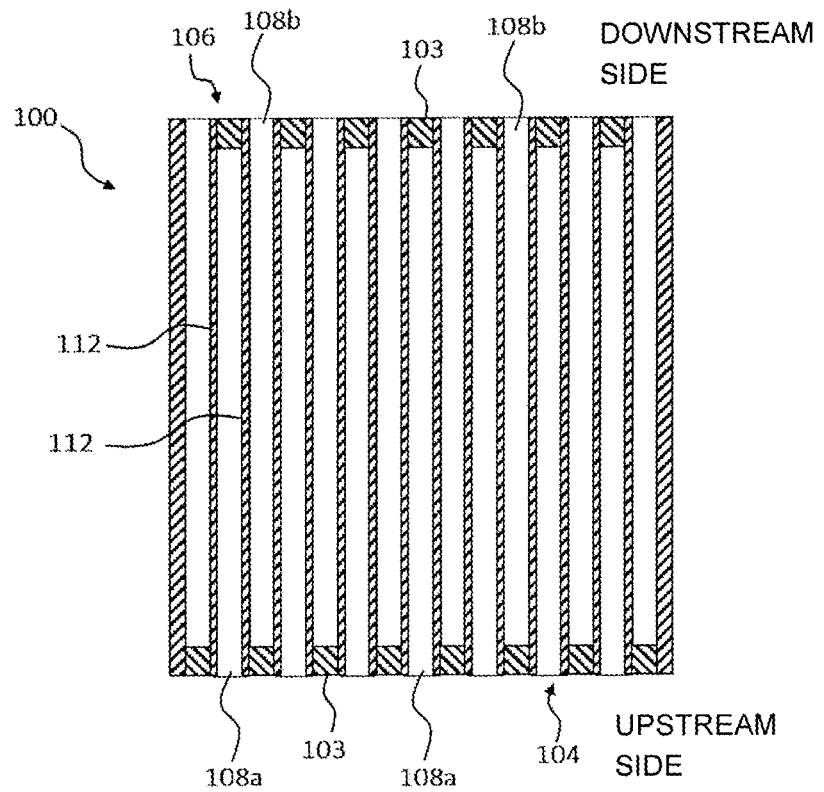
FIG. 10 is a schematic diagram for explaining a structure of a pillar-shaped honeycomb structure as an exhaust gas purifying filter.

Hereinafter, examples for better understanding the present invention and advantages thereof will be exemplified, but the present invention is not limited to the examples.
<Test Nos. 1 to 7>
An unfired honeycomb formed body made of SiC, which is a cuboid of 37 mm in length, 37 mm in width, and 154 mm in height and has cells extending in the height direction at a cell density of 46.5 pieces/cm$^2$, was prepared. An adhesive surface of a rectangular transparent film (thickness of 36 μm) made of PET (polyethylene terephthalate) of 70 mm in length, 39 mm in width (however, only No. 7 had 50 mm in length and 39 mm in width) was bonded so as to cover one of the entire bottom faces and a part of each of the pair of opposing upper and lower lateral faces of this unfired honeycomb formed body as illustrated in FIG. 9. A bonding condition of the film was as described in Table 1 in accordance with the test number.

Holes were opened by laser machining using image processing in the portion of the film covering the cells on which the plugged portion was to be disposed and then, the bottom face portion to which the mask was bonded was immersed in the plugging slurry containing a SiC powder and a metal Si powder, and the plugging slurry was filled in the end portion of the cells from the holes. In any of Nos. 1 to 7, such a phenomenon that the film was dislocated and the slurry entered into the cells other than the target one did not occur when the slurry was filled. Subsequently, the honeycomb structure in which the plugging slurry was injected was dried at 150° C. for 0.4 hours. After that, the solidified excess plugging slurry was removed by the brushing device.

Figure 11:
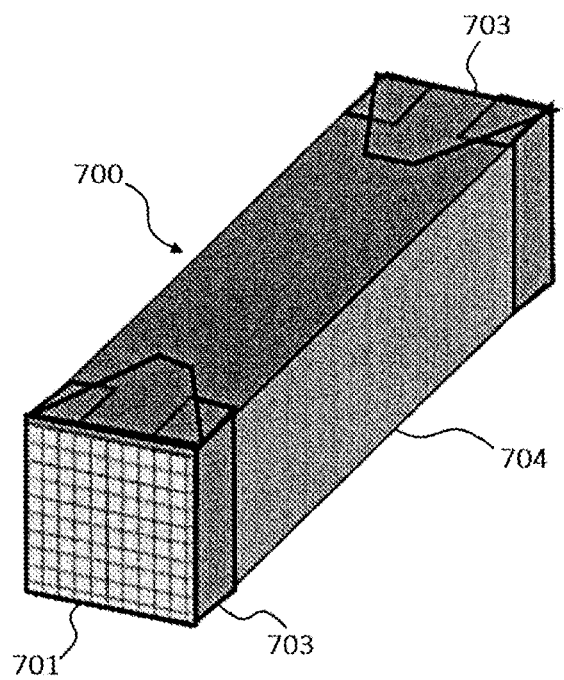
FIG. 11 is a schematic view for explaining how to bond the film to the honeycomb formed body taught in Patent Literature 1.

Subsequently, the protruding portion of the film bonded to the upper lateral face of the honeycomb formed body was raised up by the air injector illustrated in FIG. 5. The protruding portion of the film was easily raised up for Nos. 1 to 6. For No. 7, the film could be raised up, but since the protruding portion had no folded-back portion, a range of the injection angle of the air which could raise up the protruding portion was small. After that, for Nos. 1 to 5, the raised-up protruding portion was gripped, and the film was peeled off by the film peeling-off device having the gripping claws illustrated in FIG. 6. Moreover, for Nos. 6 and 7, the film was peeled off by the rotating brush on which a plurality of brush bristles made of nylon (brush bristle length: 25 mm, wire diameter 0.4 mm) was planted in a shape of a circular ring having an outer diameter of 60 mm on the surface of a disk base body having an outer diameter of 90 mm as illustrated in FIGS. 7A and 7B with a rotation number of 330 rpm and a brush pushing-in amount 1 mm. The peeling-off test was conducted continuously 100 times for each of the test numbers, and the percentage where the film was completely peeled off was calculated as a "peeling-off rate". The result is shown in Table 1.
<Test No. 8 (Comparative Example)>
The unfired honeycomb formed body same as No. 1 was prepared. Subsequently, a rectangular transparent film (thickness of 36 μm) made of PET (polyethylene terephthalate) of 70 mm in length, 55 mm in width was bonded so as to cover one of the entire bottom faces of this unfired honeycomb formed body. At this time, the film was disposed so that a distance from one side of the bottom face of the unfired honeycomb formed body to a closer long side of the film was 9 mm and a distance from one side of the bottom face of the unfired honeycomb formed body to a closer short side of the film was 16.5 mm. Subsequently, the portion protruding from the bottom face was folded as illustrated in FIG. 11 and was bonded to the four lateral faces of the honeycomb formed body.

After that, injection of the plugging slurry into the cell end portion and removal of the solidified excess plugging slurry were performed by the procedure similar to that of No. 1. Subsequently, the protruding portion of the film bonded to the upper lateral face of the honeycomb formed body was raised up by the air injector under the same condition as that of No. 1, and the film was peeled off by gripping the raised-up protruding portion by the film peeling-off device having the gripping claws illustrated in FIG. 6. The peeling-off test was conducted 100 times continuously, and the percentage where the film was completely peeled off was calculated as a "peeling-off rate". The result is shown in Table 1.

TABLE 1

| No. | UPPER-SIDE PROTRUDING LENGTH [mm] | LOWER-SIDE PROTRUDING LENGTH [mm] | FOLDED-BACK LENGTH [mm] | FILM PEELING-OFF METHOD | UPPER-SIDE PROTRUDING PORTION ADHESIVE AREA [mm$^2$] | PEELING-OFF RATE [%] |
|---|---|---|---|---|---|---|
| 1 | 26 | 7 | 10 | GRIPPING CLAW | 222 | 96 |
| 2 | 26 | 7 | 12 | GRIPPING CLAW | 74 | 98 |
| 3 | 26 | 7 | 6 | GRIPPING CLAW | 518 | 93 |
| 4 | 31 | 2 | 12 | GRIPPING CLAW | 259 | 93 |
| 5 | 21 | 12 | 8 | GRIPPING CLAW | 185 | 98 |
| 6 | 26 | 7 | 10 | BRUSH | 222 | 98 |
| 7 | 6 | 7 | 0 | BRUSH | 222 | 97 |
| 8 | — | — | — | GRIPPING CLAW | — | 70 |

<Consideration>

It was confirmed that the peeling-off rate rose to approximately 95% by using the method in Nos. 1 to 7, while the peeling-off rate by the method of No. 8 (comparative example) was 70%.

The peeling-off rate was high for No. 1, and the film bonded to the honeycomb formed body with an appropriate adhesive area. Thus, there was little risk that the folded portion of the film naturally rose up by its restoring force for a period of time until the plugging slurry was filled after the bonding of the film, and as a result, the film was dislocated during slurry filling and the slurry entered into the cells other than the target one.

Since each of No. 2 and No. 5 had an adhesive area of the upper-side protruding portion smaller than that of No. 1, the peeling-off rate was high. Thus, there was a higher possibility than No. 1 that the folded portion of the film naturally rose up by its restoring force for a period of time until the plugging slurry was filled after the bonding of the film, and as a result, the film was dislocated during slurry filling and the slurry entered into the cells other than the target one.

Since each of No. 3 and No. 4 had an adhesive area of the upper-side protruding portion larger than that of No. 1, the concern that the film was dislocated in slurry filling was low. However, since possibility that the gripping claws would contact the adhesive surface becomes higher when the film is gripped by the gripping claws, there is a possibility that the peeled-off films adhere to the gripping claws and accumulate inside the film peeling-off device, which hinders the peeling-off operation. Accordingly, a risk that the peeling-off rate lowers in a long term is higher than that of No. 1.

From the results of No. 6 and No. 7, it was confirmed that the film could be peeled off by rubbing with the rotating brush. When the rotating brush is used, the protruding portion does not have to be folded back (No. 7).

REFERENCE SIGNS LIST 100 honeycomb formed body
102 lateral face
104 first bottom face
106 second bottom face
108 cell
108a first cell
108b second cell
112 partition wall
120 film
122 outer edge portion
123 bottom face covering portion
124 protruding portion
500 air injector
502 nozzle
504 air pipeline
600 film peeling-off device
611 gripping claw
610 gripping device
620 first linear driving device
620a connection portion
620b first shaft
620c first cylinder
630 second linear driving device
630a support body
630a1 first cylinder support surface
630b second shaft
630c second cylinder
630d second tensile coil spring
640 third linear driving device
640a support plate
640b third shaft
640c third cylinder
700 rotating brush
710 base body
712 outer peripheral profile
714 inner peripheral profile
716 suction port
720 brush bristle

What is claimed is:

1. A masking method for a honeycomb formed body, comprising steps of:
    preparing the honeycomb formed body in a quadrangular prism shape including a plurality of cells extending from a first bottom face to a second bottom face;
    preparing at least one sheet of film having an adhesive surface on one main surface and a non-adhesive surface on another main surface; and
    bonding the film on at least one bottom face of the first bottom face and the second bottom face of the honeycomb formed body such that the adhesive surface is in contact with the at least one bottom face, wherein
    the step of bonding the film includes bonding of the film so as to have:
    a bottom face covering portion that covers a whole surface of the at least one bottom face; and
    a pair of outer edge portions along one pair of opposite sides of a quadrangle defining an outer peripheral shape of the at least one bottom face and a pair of protruding portions protruding from another pair of opposite sides of the quadrangle; and
    bonding at least a part of the adhesive surface of each of the pair of protruding portions such that the pair of protruding portions are in contact with a pair of opposing lateral faces of the honeycomb formed body but the pair of outer edge portions are not in contact with another pair of opposing lateral faces of the honeycomb formed body.

2. The masking method for a honeycomb formed body according to claim 1,
    wherein the step of bonding comprises folding back at least one of the protruding portions and bonding at least a part of adhesive surfaces of the at least one of the protruding portions together.

3. The masking method for a honeycomb formed body according to claim 2,
    wherein in the at least one of the protruding portions, bonding of the at least a part of the adhesive surfaces is performed so that 30% or more of an area of the adhesive surface of the at least one of the protruding portions is shielded.

4. The masking method for a honeycomb formed body according to claim 2,
    wherein the step of bonding comprises folding back the at least one of the protruding portions in parallel with aside of the quadrangle, the side of the quadrangle forming a boundary of the at least one of the protruding portions.

5. The masking method for a honeycomb formed body according to claim 1,
    wherein an area where the adhesive surface is in contact with at least one of the lateral faces of the pair of opposing lateral faces of the honeycomb formed body is 800 mm$^2$ or less in each of the protruding portions.

6. A plugged portion forming method for a honeycomb formed body, comprising steps of:
    performing the masking method for the honeycomb formed body according to claim 1;

opening a plurality of holes in the bottom face covering portion of the film and then, injecting plugging slurry into the holes;

drying and solidifying the plugging slurry;

removing the solidified plugging slurry adhering to the film; and peeling the film off the honeycomb formed body.

7. The plugged portion forming method for a honeycomb formed body according to claim 6, wherein the step of peeling the film off the honeycomb formed body includes steps of:

raising up at least one of the protruding portions of the film with an air blow from an air injector; and peeling the film off the honeycomb formed body by gripping at least one of the raised-up protruding portions with a film peeling-off device having a gripper.

8. The plugged portion forming method for a honeycomb formed body according to claim 7, wherein at least one of the protruding portions of the film has a portion having both outer surfaces being non-adhesive surfaces formed by folding back the at least one of the protruding portions and by bonding at least a part of the adhesive surfaces of the at least one of the protruding portions together, and the film peeling-off device grips the portion having both outer surfaces being the non-adhesive surfaces in the at least one of the raised-up protruding portions.

9. The plugged portion forming method for a honeycomb formed body according to claim 7, wherein the step of peeling the film off the honeycomb formed body comprises brushing the bottom face covering portion of the film.

10. The plugged portion forming method for a honeycomb formed body according to claim 9, wherein the step of peeling the film off the honeycomb formed body comprises rotating at least one rotating brush having a rotation axis in parallel with a direction in which the cells extend, the rotating brush including a base body rotatable around the rotation axis and a plurality of brush bristles planted on a surface of the base body, while bringing the brush bristles into contact with the bottom face covering portion of the film.

11. A manufacturing method of a honeycomb fired product, comprising firing the honeycomb formed body obtained by implementing the plugged portion forming method according to claim 7.

* * * * *